June 30, 1959   R. MONAGHAN   2,892,977
DIFFERENTIAL CONDUCTIVITY PIPE TESTING
Filed Dec. 30, 1954   3 Sheets-Sheet 2
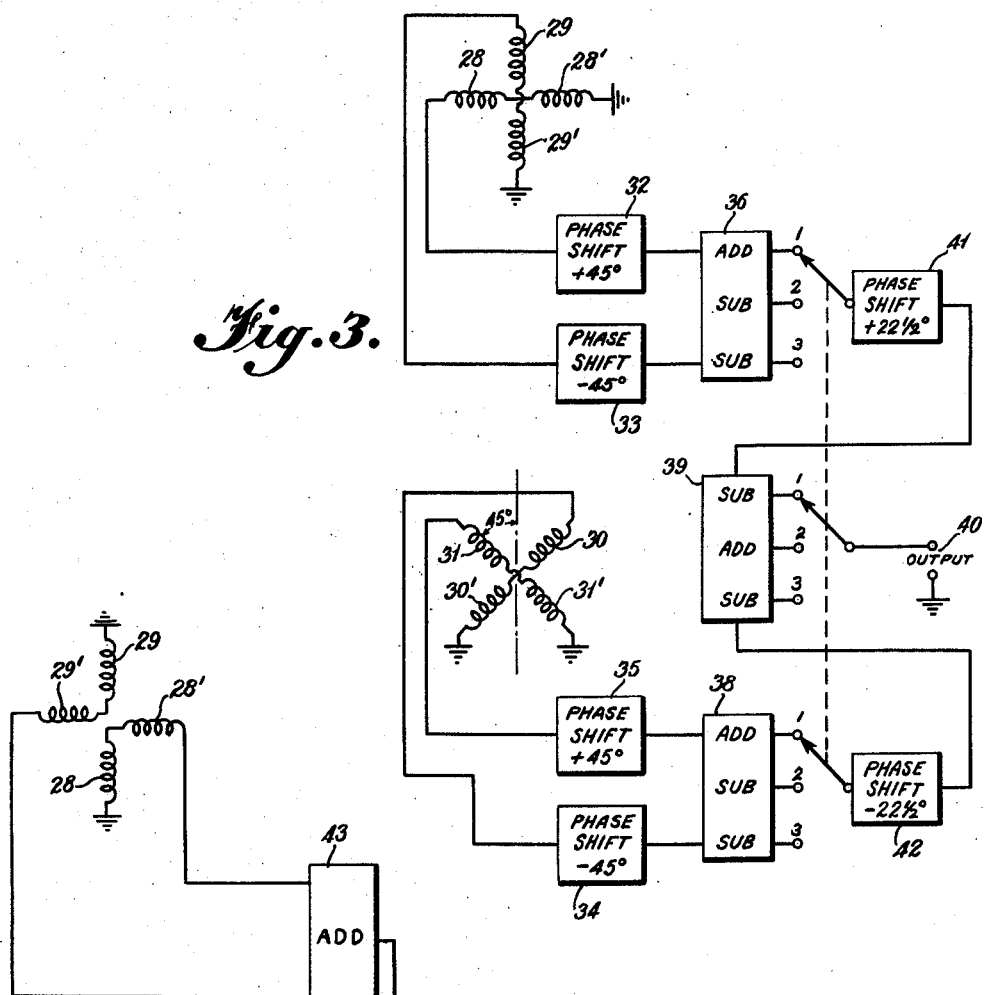
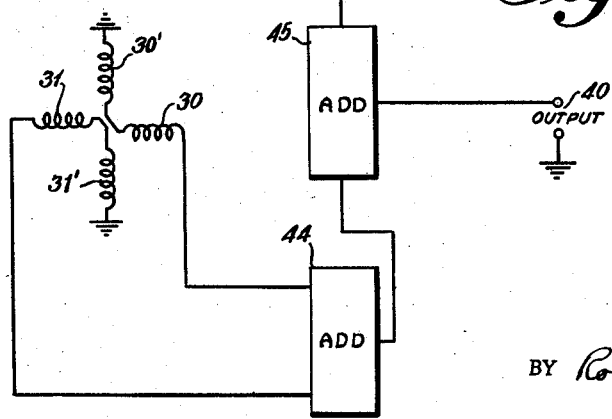
INVENTOR
*Ralph Monaghan*
BY *Robert K. Schumacher*
ATTORNEY June 30, 1959 R. MONAGHAN 2,892,977
DIFFERENTIAL CONDUCTIVITY PIPE TESTING
Filed Dec. 30, 1954 3 Sheets-Sheet 3

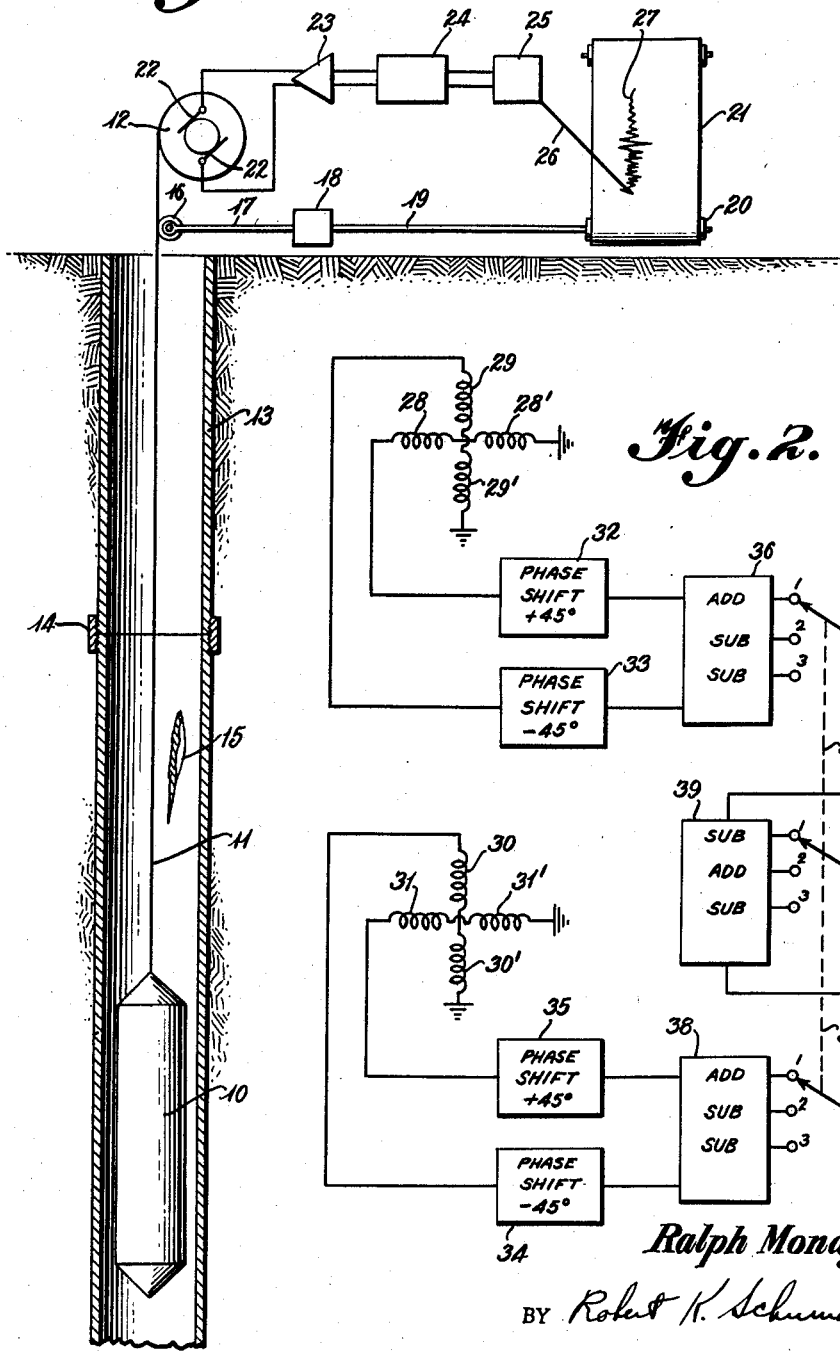

INVENTOR
Ralph Monaghan
BY Robert K. Schumacher
ATTORNEY

United States Patent Office 2,892,977
Patented June 30, 1959

2,892,977

DIFFERENTIAL CONDUCTIVITY PIPE TESTING

Ralph Monaghan, Tulsa, Okla., assignor to Well Surveys, Incorporated, a corporation of Delaware Application December 30, 1954, Serial No. 478,795

12 Claims. (Cl. 324—37)

This invention relates to apparatus for detecting discontinuity in well casings for bore holes. By the term discontinuity is meant a casing collar, joint, rips, mill slots, windows or any similar circumferential or longitudinal flaws in the well casing. Also the term casing includes any elongated member, cylindrical in cross-section.

The present invention is based on an electromagnetic system for the detection of discontinuities in well casings. When a magnetic field is set up within the casing the lines of force enter the casing in the region of the magnetic field. The casing thereby provides a flux path for these lines of force created by this magnetic field. Any discontinuities in the part of the casing providing the path affect the distribution of these force lines and this effect is detectable.

The present invention relates to a novel appratus embodying the above-mentioned theory of operation.

In a copending application Serial No. 423,968 filed on April 19, 1954, inventor Robert E. Fearon, the above-mentioned magnetic field is applied to the detection of collars and joints; in other words, circumferential discontinuities in well casings. In this copending application a rotating magnetic field was set up in the well casing by a motor-driven bar magnet rotating at a constant velocity. A means was provided to detect both of the components of this field, said components being, of course, 180° out of phase. The magnetic lines of force emanating from the rotating bar magnet flowed from the north pole of the magnet through the casing in an axial direction and leaped across the air gap within the casing to the other side of the casing and back into the south pole of the magnet. The lines of force in passing through the casing in the manner set forth above created an eddy current as there described which flowed axially of the casing. As a result of this eddy current an opposing magnetic field was created which affected the magnetic field of the rotating bar magnet. The amount of eddy current and, consequently, the strength of the magnetic field set up thereby, depended on the resistance path of the eddy current and consequently when said eddy current was forced to pass through a discontinuity of a circumferential nature such as a joint or collar, the amount of the eddy current was decreased and consequently so was the strength of the magnetic field set up thereby. This decrease of magnetic field due to the eddy current was a detectable decrease and means were provided in this copending application for detecting this decrease of magnetic field created by the eddy current. The means for detecting this decrease took the form of a coil or coils positioned with respect to the magnet so as to detect opposite flux components thereof. As the magnet rotated, the lines of force from these components were cut by the coil or coils and voltages were thereby induced in said coils. In the presence of a joint or casing collar the induced voltages detected by these coils increased due to the decrease of the effect of the magnetic field set up by the decreasing eddy current. As the magnet rotated and the situation was affected by a circumferential discontinuity such as the collar and joint, the increase of induced voltage in the coil or coils was constant in all azimuth positions of the bar magnet.

When dealing with non-circumferential discontinuities there is an increase of induced voltage only at such time as the magnetic field produced by the bar magnet is affected by this non-circumferential or longitudinal discontinuity. This means that, during the rotation of the magnetic field by the rotation of the bar magnet, the induced voltage in the coil or coils will be the same as regular pipe except at that azimuth position of the bar magnet where the longitudinal discontinuity provides part of the flux path of the lines of flux produced by the bar magnet. This detectable increase in induced voltage in the coil or coils at a particular azimuth position forms the basis of the present invention with relation to the detection of these longitudinal discontinuities.

It is therefore an object of this invention to provide an apparatus for detecting both circumferential and non-circumferential discontinuities in well casings.

It is another object of this invention to provide an apparatus for distinguishing between circumferential and non-circumferential discontinuities.

It is another object of this invention to provide an apparatus for detecting only non-circumferential discontinuities while eliminating the effects of circumferential discontinuities.

It is another object of this invention to provide apparatus for locating axially and angularly these non-circumferential discontinuities.

It is another object of this invention to provide apparatus for eliminating any so-called blind spots in the detection of non-circumferential or longitudinal discontinuities.

These and other objects of the present invention will be apparent from the following description of the accompanying drawings:

Figure 1 is a diagrammatic representation of the overall system employed in accordance with this invention;

Figure 2 is a diagrammatic illustration of one embodiment of the present invention showing apparatus for detecting both circumferential and non-circumferential discontinuities;

Figure 3 is a diagrammatic illustration of another embodiment of the invention illustrated in Figure 2;

Figure 4 is a diagrammatic illustration of still another embodiment of the present invention;

Figure 5:
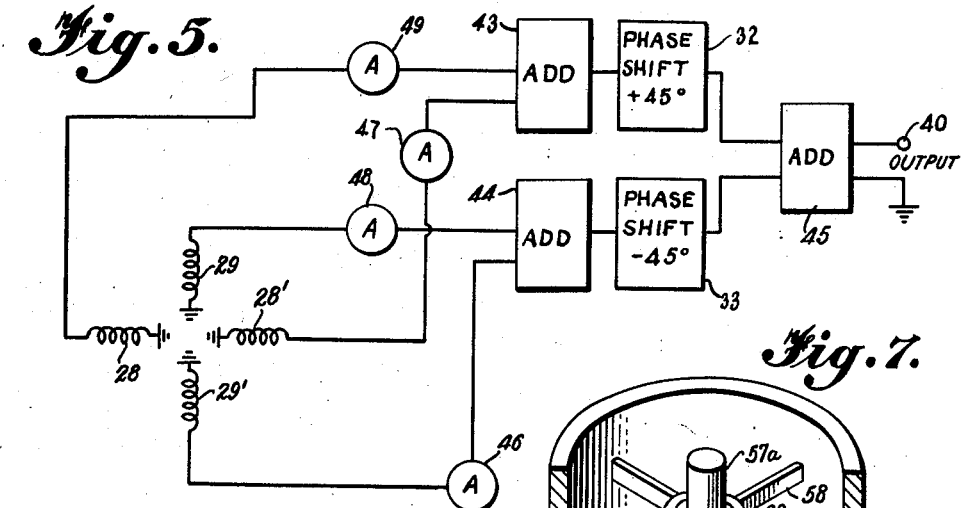
Figure 5 is a diagrammatic illustration of still another embodiment of the present invention.

Turning to Figure 1, the numeral 10 indicates a capsule or housing for containing some of the elements of the present invention. Within this housing 10 are the elements which form the detecting portion of this invention. The housing 10 is lowered into the bore hole by means of the cable 11 which extends over the drum 12. The bore hole is cased with the casing 13 and a circumferential discontinuity is indicated by the collar 14. A longitudinal discontinuity or non-circumferential discontinuity is indicated by the flaw 15. As the housing 10 is lowered by the cable 11 into the bore hole, the cable passes over a measuring reel 16 which drives a shaft 17 which operates through a gear box 18 to drive shaft 19. The shaft 19 is connected to the recorder roller 20 which drives the recording strip 21 in accurate correlation with the depth of the housing 10. The information which results from the detection of the discontinuities is taken off of the cable by commutators and brushes such as 22 and fed to an amplifier 23. Of course, there may be as many commutators and brushes as are necessary, only two being illustrated here. The amplified information is passed to a network 24 which we shall, for now, call the add-subtract network. The function of this network will be described later. The output of network 24 is fed to a recorder 25 which may be any well-known type. This recorder 25 drives a stylus 26 which records the information 27 on the paper strip 21. Of course, the exact recording means is not per se part of this invention, but any convenient means for correlating detected information with depth may be used.

Figure 2 illustrates a setup for detecting circumferential and non-circumferential discontinuities in the well casing and distinguishing between the two. Group 1 coils are those identified by numerals 28, 28', 29 and 29'. Group 2 coils are those identified by numerals 30, 30', 31 and 31'. Coils 28 and 28' are connected additively, as are the other pairs of coils 29 and 29', 30 and 30', and 31 and 31', respectively. The group 1 coils are positioned in the housing 10 of Figure 1 above the rotating magnet (not shown here) and the coils of group 2 are positioned below the rotating magnet. The coils of each group are preferably spaced at right angles in a plane transverse to the axis. The actual structural means for accomplishing this will be discussed in detail with relation to Figures 6 and 7. For the present, let us consider that there is a rotating magnet providing a rotating magnetic field, rotating at a uniform velocity, which rotating magnet is positioned between group 1 and group 2 coils. The voltage induced in a coil is proportional to the time rate of change of flux linked by the coil. In the case of a rotating field, the induced voltage is proportional to the angular velocity as well as the maximum flux linked by the coil. The angular velocity is made uniform in this invention in order that the induced voltage be proportional only to the maximum flux linked during one cycle. The maximum flux linked depends upon the field distribution as influenced by discontinuities. Therefore, the voltage induced depends upon the character of the casing. In the case of a circumferential discontinuity such as a joint which is positioned so as to affect the flux distribution in the group 1 coils but not to affect this distribution in the group 2 coils, let it be supposed that the normal voltage induced in any of the coils of the group 1 and group 2 coils is N volts A.C. In accordance with the principle previously discussed, the presence of the circumferential discontinuity such as the joint will change the induced voltage in the group 1 coils by a significant amount. The voltage induced in each coil then will be N+A where A is the number of volts change caused by the presence of the joint. The voltages induced in 29, 29', 28, and 28' will each be N+A assuming each coil is equally affected by the discontinuity. Phase shift networks 32 and 33 are provided to adjust for the 90° mechanical difference in the two branches of the group 1 coils. The phase shift networks may comprise condensers, inductances and resistances combined in a conventional manner. Of course, where the mechanical difference is other than 90° the phase shift networks are correspondingly different. Furthermore, although each phase shift network is shown to be 45°, it is only necessary that the sum of the phase shifts introduced equal the mechanical difference in position. The output of network 32 is added to the output of network 33 in position 1 of the gang switch 37, the addition resulting in a voltage equal to $4N+4A$.

Now, the identical reaction takes place in the group 2 coils except, of course, the joint has no effect on the induced voltages therein. The group 2 coils may be so wound and connected that the voltage in each of the group 2 coils is equal to N and in phase with the voltage in the corresponding coil of group 1. Consequently the outputs of phase shift networks 34 and 35, when added, produce a voltage of 4N in position number 1 of the gang switch 37. The phase shift networks 34 and 35 are such as to make the combined output of add-subtract network 38 in phase with the output of add-subtract network 36. The outputs of add-subtract networks 36 and 38 are, in the number 1 position of the gang switch, subtracted in the network 39. In switch position 1, the voltages applied respectively to networks 36 and 38 are thereby added, and the respective outputs are subtracted by network 39. In switch position 2, the applied voltages are subtracted by networks 36 and 38 and added by network 39. In switch position 3, the applied voltages are subtracted by networks 36 and 38 and also by network 39. In the particular case under consideration, the subtraction results in an output to output posts 40 of a voltage of 4A. Network 24 of Figure 1 contains all of these add and subtract networks and possibly the phase shift networks which have been described with relation to Figure 2. If desired the method described in copending application Ser. No. 423,968 could be used to provide phase reference.

In position 2 of the gang switch 37 the outputs of networks 32 and 33 are subtracted, resulting in zero voltage output. The subtraction of the outputs of networks 34 and 35 also produces zero volts. Consequently, the output at posts 40 in position 2 of the gang switch 37 will be zero. The output is also zero in position 3 of the gang switch 37. The above is true whether or not the joint affects only the group 1 set of coils or only the group 2 set of coils. It is not essential, however, to distinguish between these two cases.

Now, let us take the case of a local flaw of a non-circumferential nature affecting only the group 1 coils and further, let us assume that this local flaw will induce a voltage B into the coil affected by the flaw by virtue of the proximity of the flaw to that particular coil. Depending upon the magnetic circuit, the flaw may or may not cause a signal in the coil coaxial with the coil near the flaw. The result will be the same if these coils are connected so that the signals are additive. It may be assumed that the output of connected coils is B volts. Under such conditions, with network 36 in the subtract condition, the output thereof would be B volts in the presence of a non-circumferential discontinuity and zero volts in the presence of a uniform circumferential discontinuity. Thus one group of coils may be used to detect non-circumferential discontinuities to the exclusion of circumferential discontinuities. However, the use of two groups of coils makes it possible to detect either type of discontinuity, as desired, by changing a switch position.

In the case of a local non-circumferential flaw and in position 1 of the gang switch 37 the output 40 would be B volts, in position 2 it would be B volts and in position 3 it would also be B volts. For the condition of a local flaw affecting only the group 2 coils, position 1 of the switch would result in B volts, position 2 would result in B volts and position 3 would result in B volts.

Now, let us take the case of a non-circumferential discontinuity which extends so as to affect both groups of coils equally. The output at 40 in position 1 of the switch will be zero volts, in position 2 it will be 2B volts and in position 3 it will be zero volts. Under normal pipe conditions the output would be in positions 1, 2 and 3, zero volts. The above results are compiled in the table below:

| Switch Position | 1 | 2 | 3 |
|---|---|---|---|
| Collar at Group 1 | 4A | 0 | 0 |
| Collar at Group 2 | 4A | 0 | 0 |
| Local Flaw at Group 1 | B | B | B |
| Local Flaw at Group 2 | B | B | B |
| Non-Circumferential Flaw Affecting Groups 1 and 2 | 0 | 2B | 0 |
| Normal Pipe | 0 | 0 | 0 |

It can be seen from an examination of the table that by moving from one switch position to another not only can both circumferential and non-circumferential discontinuities be detected, but also they can be distinguished one from the other. In addition, it can also be discovered whether or not in the case of a longitudinal flaw it is localized in either the vicinity of the top or bottom coils or whether it extends to affect both. By compounding add-subtract networks, this may be accomplished electrically in a manner similar to the above. Alternatively, continuous measurements can be made for all switch positions at once by providing a plurality of output channels from each add-subtract network.

One problem in connection with the apparatus of Figure 2 becomes evident. The groups of coils are contained in parallel planes perpendicular to the central axis of the bore hole, and the magnetic field rotates in a plane between and parallel to the planes containing the groups of coils. The coils in group 1 and group 2 are angularly in alignment in each of the planes. In other words, coils 31 and 31' are directly below coils 28 and 28' and parallel thereto. The same relation is true of coils 29 and 29', and 30 and 30'. If under such a setup there happens to be a longitudinal discontinuity along any of the angular bisectors of the groups of coils, then a blind spot occurs. To illustrate this, let it be assumed that there is a longitudinal discontinuity which runs along a position half-way between coils 28' and 29 and half-way between coils 30 and 31'. The results in the three positions of the switch would be the same as normal pipe (see reference table). To solve this problem, reference is now made to the coil arrangement shown in Figure 3 where like numbers refer to like parts with relation to Figure 2. The coils of group 2 have been shifted 45° in their horizontal plane. Therefore, the coils of group 1 and those of group 2 no longer are in azimuth alignment in their respective planes. It can be seen that by virtue of this, the original blind spot referred to above has been eliminated. To compensate for this 45° shift an additional shift of both groups of coils is needed. This is provided by phase shift network 41, which shifts group 1 coils +22½° and phase shift network 42, which shifts group 2 coils −22½°. Everything else in the setup is the same as that in Figure 2. Of course, 45° has been arbitrarily chosen for purposes of illustration. Any other convenient angle may have been chosen with appropriate changes in the phase shifts provided by the networks 41 and 42.

Where it is desired to detect only non-circumferential flaws, the blind spot may be eliminated by placing the two groups of coils on the same side of the rotating magnet, even all in the same plane. Indeed, the blind spot may be eliminated by using only three pairs of coils in the same plane, spaced preferably 60° apart. The output of respective pairs of coils would be put in proper relative phase by similar phase shift networks and then combined in a similar fashion to provide a signal only in the presence of a non-circumferential flaw.

Referring to Figure 4, there is shown another embodiment of the present invention illustrating particularly a new arrangement of the coils. Again like parts are given like numeral identifications. This embodiment is designed to detect only non-circumferential discontinuities. With the coils connected as shown, the voltage induced in 29 and 29' is 180° out of phase with the voltage induced in coils 28 and 28'. Likewise the voltage induced in coils 30 and 30' is 180° out of phase with that induced in 31 and 31'. Therefore the voltages may be combined directly without correcting for phase shift produced by the mechanical displacement. Adding networks 43 and 44 therefore produce output signals in the event of unbalance of induced voltages caused by non-circumferential discontinuities. It is to be noted that the pairs of coils of group 2 are displaced 90° from the respective pairs of coils of group 1. This eliminates the blind spots. The outputs of networks 43 and 44 may be separately recorded as indicative of flaws near the respective groups of coils, or they may be added in adding network 45 and recorded.

Referring now to Figure 5, there is illustrated still another embodiment of the present invention, and again, like parts are given like numeral identifications. This setup is also for detecting only non-circumferential discontinuities but has the added advantage of being able to not only detect them axially along the bore hole, but also angularly. This is done by making each coil independent and extending them in a horizontal plane at 90° with respect to each other. Then into each coil circuit is placed a means of indicating the induced voltage or current in the coil. Shown here are four ammeters 46, 47, 48 and 49. If, for instance, the flaw is closest to coil 29, then ammeter 48 will give the highest reading. Generally speaking, then, the ammeter which gives the highest current reading indicates the coil nearest the flaw in an angular or azimuthal direction. Since the outputs of opposite coils are 180° out of phase, they may be directly combined in respective adding networks as was done in the embodiment of Figure 4. The outputs of adding networks 43 and 44 must be phase shifted as in the embodiment of Figure 2 so that they may be combined in phase in adding network 45. The output of network 45 is then effectively the same as the output of network 36 of Figure 2 when the switch is in positions 2 or 3. The coils of group 2 could be similarly connected and the outputs combined as in Figure 2.

A phase reference system, such as is disclosed in copending application Serial No. 423,968, could be used instead of the ammeters to identify the coil nearest the flaw.

Now, in connection with the embodiment of Figure 5, it is quite evident that it is important to know the azimuth position of each of the coils at any one time. To do this the housing 10 may be kept in its original alignment by use of a gyroscope. Any tendency of the housing to rotate is prevented by the gyroscope, and since the coils are attached in a fixed relation to the housing, their position in the azimuth direction is always known. Alternatively, gyroscopic means could be used to identify the angular displacement of a housing free to rotate.

Figure 6:
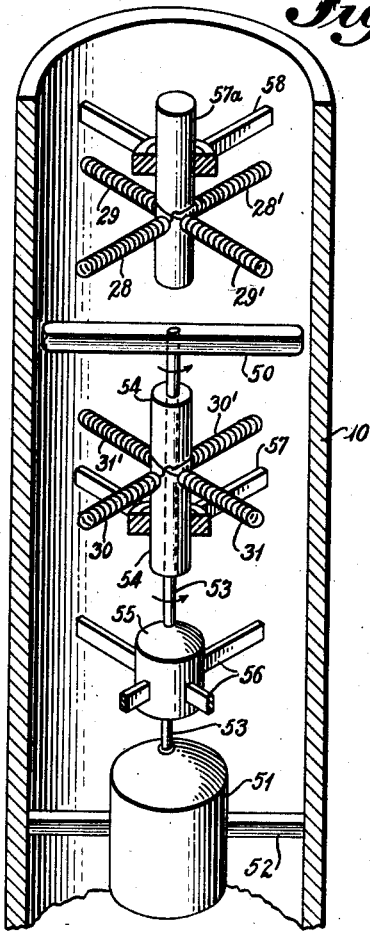
Figure 6 is a view partly diagrammatic and partly in section showing a means of driving a bar magnet while mounting the coils stationary with relation thereto.
Figure 7:
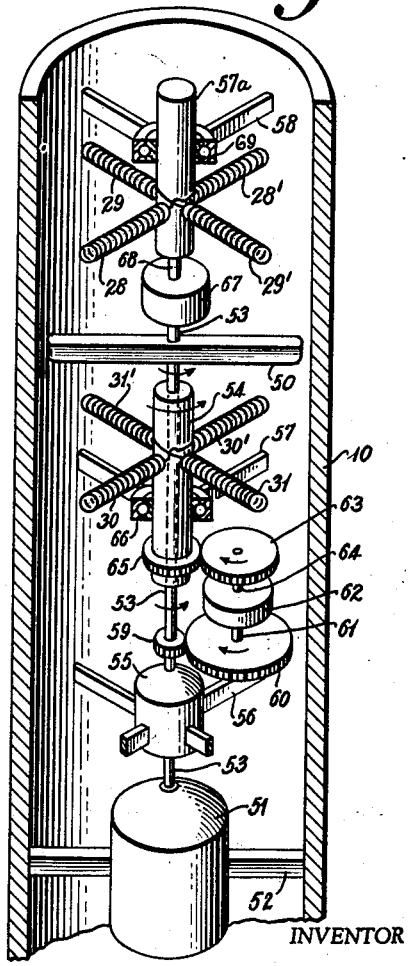
Figure 7 is a view partly in section and partly diagrammatic showing a means of providing relative motion between the coils and the magnet by rotating both at different speeds.

Referring now to Figure 6, there is shown housing 10 and the means of providing the rotating field within this housing. The bar magnet 50 is mounted to shaft 53 which shaft extends through the sleeve 54 and bearing 55 to the motor 51. The magnet 50 may operate near 15 cycles per second for satisfactory operation. The motor in turn is supported to the housing by some means such as supports 52 mounted to the housing 10. Bearing 55 is supported by supports 56. The coils of group 2, those below the magnet, are fixedly mounted to the sleeve 54. The sleeve in turn is mounted to the housing by supports 57. Group 1 coils above the magnet are fixedly mounted to any means such as the sleeve 57a, which in turn is mounted to the housing 10 by virtue of supports 58, which are similar in construction to the supports 57.

It can be seen here that the motor turns the magnet 50 in the direction indicated by the arrow to provide the rotating field, while the coils remain stationary with relation thereto. In order to eliminate blind spots, the coils may also be rotated at a frequency other than that at which the magnet is rotating. This is illustrated in Fig. 7, where again, like parts are given like numeric designations. Here a gear 59 is mounted to the shaft 53 and engages a gear 60 which is mounted to a shaft 61. The shaft 61 leads into a reduction gear box 62, the output therefrom being taken from the gear 63 mounted to the shaft 64. This gear 63 meshes with the gear 65 mounted to the sleeve 54. Sleeve 54 is mounted in bearing 66 to permit it to rotate at a different speed from, preferably less than, the speed of the magnet 50.

Shaft 53 is extended in this case through the magnet 50 to a reduction gear box 67 which turns shaft 68, which shaft rotates the sleeve 57a. The result here is a reduced gearing to cause the sleeve 57a to rotate in bearing 69 at the same speed as the sleeve 54. Slip ring and brush connections, not shown, may be used to connect the coils electrically with succeeding apparatus.

What have been illustrated herein are specific embodiments of the present invention. Other embodiments obvious to those skilled in the art from the teachings herein are contemplated to be within the spirit and scope of the following claims.

I claim:

1. A method for detecting discontinuities in casing that comprises generating within said casing a magnetic field rotating about an axis substantially parallel to the axis of said casing, said casing forming part of the path for the lines of force generated by said field, detecting the magnetic field within the casing in two directions relatively displaced angularly about said axis of rotation by producing two electrical signals systematically related thereto, and combining the produced signals 180° out of phase to obtain a difference signal indicative of discontinuities.

2. A method for detecting discontinuities in casing that comprises generating within said casing a magnetic field rotating about an axis substantially parallel to the axis of said casing, said casing forming part of the path for the lines of force generated by said field, detecting the magnetic field within the casing in two directions relatively displaced angularly about said axis of rotation by producing two electrical signals systematically related thereto, shifting the relative phase of the signals to put them substantially in phase, and electrically subtracting the in phase signals to obtain a difference signal indicative of discontinuities.

3. Apparatus for detecting discontinuities in casing that comprises means to generate within said casing a magnetic field rotating about an axis substantially parallel to the axis of said casing, said casing forming a part of the path for the lines of force generated by said field, means within said casing to detect said magnetic field, said detecting means including a plurality of coils positioned within said casing with their magnetic axes angularly displaced from each other about said axis of rotation, and means to compare the field detected at each coil to provide a comparison signal indicative of discontinuities, said means to compare said fields comprising means for subtracting the signals induced in respective coils.

4. Apparatus for detecting discontinuities in casing that comprises means to generate within said casing a magnetic field rotating about an axis substantially parallel to the axis of said casing, said casing forming a part of the path for the lines of force generated by said field, means within said casing to detect said magnetic field, said detecting means including a plurality of coils positioned within said casing with their magnetic axes angularly displaced from each other about said axis of rotation, each coil deriving an electrical signal indicative of the field at the coil, and means for combining said derived signals substantially 180° out of phase to provide a net signal indicative of discontinuities, the net signal being substantially zero in the absence of a discontinuity, said combining means including phase shift means for shifting the relative phase of the signals induced in respective coils to permit combination of signals substantially 180° out of phase.

5. Apparatus for detecting discontinuities in casing that comprises means to generate within said casing a magnetic field rotating at a substantially constant velocity about an axis substantially parallel to the axis of said casing, said casing forming a part of the path for the lines of force generated by said field, means within said casing to detect said magnetic field, said detecting means including a pair of coil means positioned within said casing with their magnetic axes angularly displaced from each other about said axis of rotation, each coil means deriving an electrical signal indicative of the field at the coil means, and means for combining said derived signals substantially 180° out of phase to provide a net signal indicative of discontinuities, the net signal being substantially zero in the absence of a discontinuity.

6. Apparatus for detecting discontinuities in casing that comprises means to generate within said casing a magnetic field rotating at a substantially constant velocity about an axis substantially parallel to the axis of said casing, said casing forming a part of the path for the lines of force generated by said field, means within said casing to detect said magnetic field, said detecting means including a pair of coil means positioned within said casing with their magnetic axes angularly displaced from each other about said axis of rotation, each coil means deriving an electrical signal indicative of the field at the coil means, and means for combining said derived signals substantially 180° out of phase to provide a net signal indicative of discontinuities, the net signal being substantially zero in the absence of a discontinuity, said combining means including phase shift means for shifting the relative phase of the signals induced in respective coils to permit combination of signals substantially 180° out of phase.

7. Apparatus for detecting discontinuities in casing that comprises means to generate within said casing a magnetic field rotating at a substantially constant velocity about an axis substantially parallel to the axis of said casing, said casing forming part of the path for the lines of force generated by said field, means within said casing to detect said magnetic field, said detecting means including two pairs of coils, the magnetic axis of each coil being angularly displaced about said axis of rotation from the magnetic axis of the other coil in the pair and electrically connected thereto, the coils of one pair being substantially coaxial with respective coils of the other pair and axially spaced therefrom, and each coil deriving an electrical signal indicative of the field at the coil, and means for combining said derived signals substantially 180° out of phase to provide a net signal indicative of discontinuities, the net signal being substantially zero in the absence of a discontinuity.

8. Apparatus for detecting discontinuities is casing that comprises means to generate within said casing a magnetic field rotating at a substantially constant velocity about an axis substantially parallel to the axis of said casing, said casing forming a part of the path for the lines of force generated by said field, means within said casing to detect said magnetic field, said detecting means including a pair of coil means positioned within said casing, each coil means being formed of two contiguous coils with their magnetic axis angularly displaced 90° apart, the magnetic axis of each of the four coils being angularly displaced substantially 90° from the magnetic axis of the adjacent coils about said axis of rotation, each coil means deriving an electrical signal indicative of the field at the coil means, and means for combining said derived signals substantially 180° out of phase to provide a net signal indicative of discontinuities, the net signal being substantially zero in the absence of a discontinuity.

9. Apparatus for detecting discontinuities in bore hole casing including a detector unit, means to lower said unit through said cased bore hole and means to correlate the depth of said unit with the detected signal, said detector unit comprising means to generate within said casing a magnetic field rotating about an axis substantially parallel to the axis of said casing, said casing forming part of the path for the lines of force generated by said field, means to detect said magnetic field, said detecting means including a plurality of coils with their magnetic axes angularly displaced relative to each other about said axis of rotation, each coil deriving an electrical signal indicative of the field at the coil, and means for combining said derived signals differentially in phase to provide a net signal indicative of discontinuities, the net signal being substantially zero in the absence of a discontinuity.

10. Apparatus for selectively detecting discontinuities of selected types in casing that comprises means to generate within said casing a magnetic field rotating about an axis substantially parallel to the axis of said casing, said casing forming part of the path for the lines of force generated by said field; means within said casing to detect said magnetic field, said means including a pair of coil means above and a pair of coil means below said field generating means and spaced therefrom, the magnetic axis of each coil means being angularly displaced about said axis of rotation from the magnetic axis of the other coil means in the pair, and each coil means deriving an electrical signal indicative of the field at the coil means; and means to combine selectively the signals from the coil means to obtain a signal indicative of selected types of discontinuities, for circumferential discontinuities, said selective combining means comprising means for separately combining the signals derived by the coil means of each pair additively and combining the added signals differentially, and for non-circumferential discontinuities, said selective combining means comprising means for separately combining the signals derived by the coil means of each pair differentially.

11. Apparatus for selectively detecting discontinuities of selected types in casing that comprises means to generate within said casing a magnetic field rotating about an axis substantially parallel to the axis of said casing, said casing forming part of the path for the lines of force generated by said field; means within said casing to detect said magnetic field, said means including a pair of coil means above and a pair of coil means below said field generating means and spaced therefrom, the magnetic axis of each coil means being angularly displaced about said axis of rotation from the magnetic axis of the other coil means in the pair, and each coil means deriving an electrical signal indicative of the field at the coil means; and means to combine selectively the signals from the coil means to obtain a signal indicative of selected types of discontinuities, said selective combining means comprising means for separately combining the signals derived by the coil means of each pair additively, means combining the added signals differentially to obtain signals indicative of both circumferential and non-circumferential discontinuities, and means for separately combining the signals derived by the coil means of each pair differentially to obtain signals indicative of discontinuities substantially exclusive of circumferential discontinuities, the net signal being substantially zero in the absence of any discontinuity.

12. A method for selectively detecting discontinuities of selected types in casing that comprises generating within said casing a magnetic field rotating about an axis substantially parallel to the axis of said casing, said casing forming part of the path for the lines of force generated by said field, at a first pair of places detecting the magnetic field within the casing in a respective pair of directions relatively displaced angularly about said axis of rotation by deriving a first pair of electrical signals systematically related thereto, at a second pair of places axially spaced from said first pair simultaneously detecting the magnetic field within the casing in a respective pair of directions relatively displaced angularly about said axis of rotation by deriving a second pair of electrical signals systematically related thereto, combining said first pair of derived signals additively, separately combining said second pair of derived signals additively combining said additively combined signals differentially thereby deriving signals indicative of both circumferential and non-circumferential discontinuities, and separately combining at least one of said first and second pairs of derived signals differentially thereby deriving signals indicative of discontinuities substantially exclusive of circumferential discontinuities, whereby non-circumferential discontinuities are identified positively and may be separated from indications of both types of discontinuities to identify circumferential discontinuities.

References Cited in the file of this patent

UNITED STATES PATENTS

| | | |
|---|---|---|
| 2,359,894 | Brown et al. | Oct. 10, 1944 |
| 2,467,306 | Habig | Apr. 12, 1949 |